Sept. 21, 1943.  J. D. SUMMERS  2,329,955
STUFFING BOX FOR PISTON RODS AND SHAFTS
Filed May 9, 1942  2 Sheets-Sheet 2
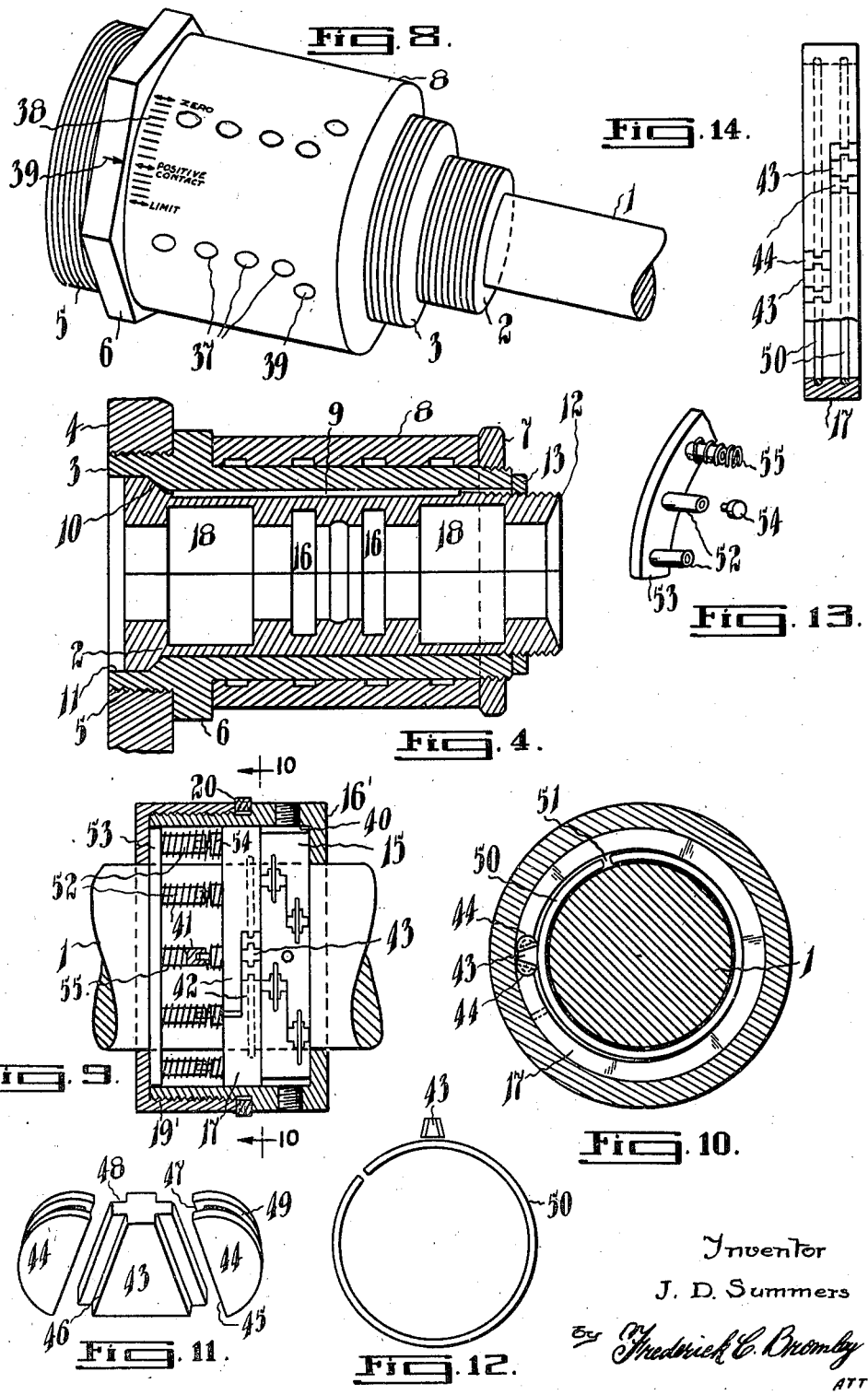
Inventor
J. D. Summers
By Frederick E. Bromley
ATTY.

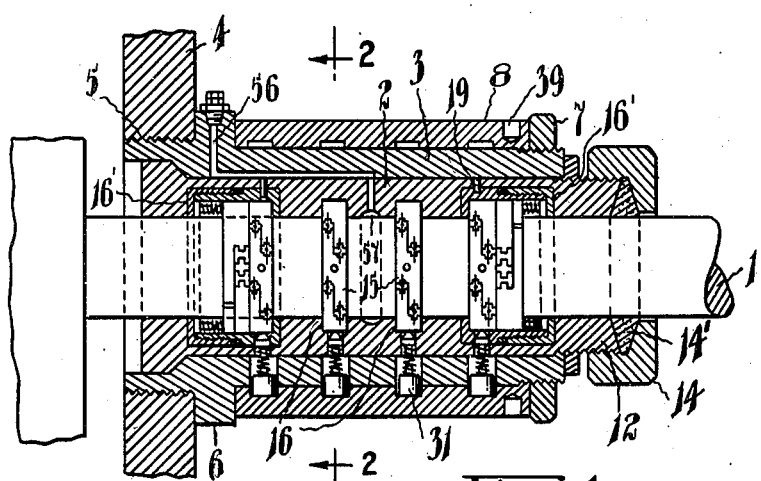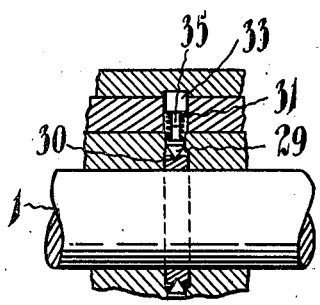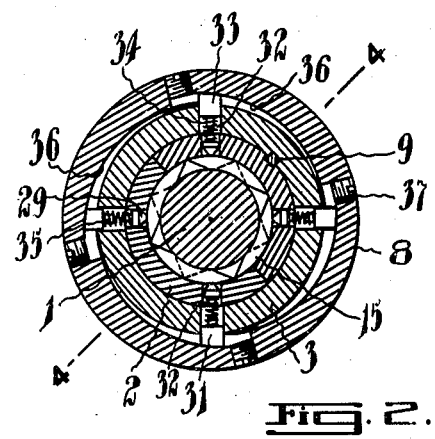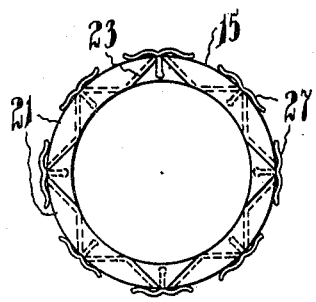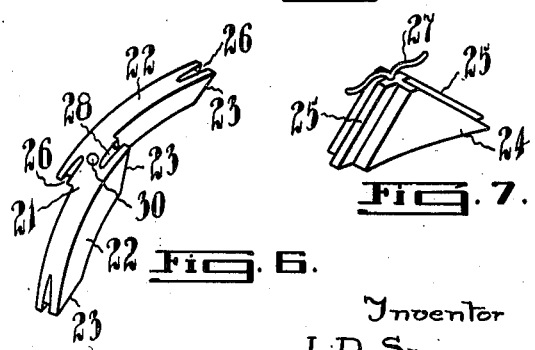

Patented Sept. 21, 1943

2,329,955

UNITED STATES PATENT OFFICE 2,329,955

STUFFING BOX FOR PISTON RODS AND SHAFTS

John D. Summers, Toronto, Ontario, Canada

Application May 9, 1942, Serial No. 442,333

10 Claims. (Cl. 286—24)

The invention appertains to a stuffing box for piston rods, shafts, and like parts of prime movers and machines, and has for its main object the provision of a highly efficient and serviceable stuffing box structure.

The invention has for a further object the furnishing of a stuffing box which, owing to its construction, will largely reduce servicing for maintenance, and in which leakage is not likely to develop from time to time as is common to the conventional stuffing box.

The invention has for a still further object the production of a stuffing box which will obviate the need of re-packing and adjustment as is usually required in an ordinary structure; and one which will promote safety and assure of a complete and effective seal irrespective of temperature conditions, as is encountered in the use of a stuffing box of a refrigerator-compressor. By reason of the extreme variation in temperature of a refrigerating plant, the compressor-stuffing box is prone to demand considerable care and attention in its maintenance, and this can be reduced to a minimum by employing a stuffing box in accordance with the present invention.

A distinctive feature of the invention resides in the novel construction and arrangement of contraction and expansion rings for producing a seal in place of ordinary packing. The contractile rings are very flexible to conform to the requirement of a packing, and will not "blow out" when subject to extreme high pressures as is met with in machinery of oil wells, et cetera.

The invention produces a structure in which an oil and pressure seal is formed and hence is admirably suited for electric motors, crankshafts of engines, and valve stems, or for any other device in which a sealing medium is required.

The invention is illustrated in the accompanying drawings, in which

Fig. 1 is a longitudinal section of the stuffing box.

Fig. 2 is a cross section on line 2—2 thereof.

Fig. 3 is a sectional detail showing one of the contractile rings with a pressure shoe fully compressed by a cam sleeve.

Fig. 4 is a longitudinal section showing the stuffing box without the rings and their operating parts.

Fig. 5 is a side view of one of the contractile rings.

Fig. 6 is a perspective view of a segment of this ring.

Fig. 7 is a similar view illustrating one of the wedges for this ring.

Fig. 8 is a view illustrating the general appearance of the stuffing box.

Fig. 9 is a detail of the cage assembly of a contractile and an expansile ring.

Fig. 10 is a cross section on line 10—10 of Fig. 9.

Fig. 11 is a detail of the wedge and rockers for an expansile ring.

Fig. 12 is a side view of an expander for the wedge of the expansile ring, which is also shown therein.

Fig. 13 is a fragmentary detail of the plate which carries the axial thrust shoes shown in Fig. 9.

Fig. 14 shows a modified form of expansile ring.

Like numerals of reference denote similar parts in each figure of the drawings.

As shown in the drawings, the stuffing box is desirably constructed as a self-contained unit for sealing a piston rod 1 of a cylinder or equivalent element, and comprises a ring container sleeve 2 fitted in a housing 3 of a general cylindrical shape. One end of the housing is devised for attachment to the cylinder head 4 as by screw threads 5 and a shoulder-forming enlargement 6 of a hexagonal cross section for receiving a tool for turning purposes. The other end is threadedly engaged with a nut 7 used for securing an adjustment sleeve 8 in set position, which is shouldered against the enlargement 6 and rotatably mounted upon the housing for a purpose that will be explained later.

Sleeve 2 receives the reciprocating shaft 1 and is held against turning in the housing by means of a key 9, and has its inner end enlarged as at 10 and shouldered in a counter bore 11 of the housing, the outer end 12 being threadedly engaged by a check nut 13 which is tightened against the adjacent end face of the housing to secure the sleeve firmly in place. As will best be seen from Fig. 2, this sleeve is formed in two parts or halves by diametrical division, which provides for the assembly of the sealing rings and their associated components before the sleeve is inserted in the housing. Before describing the structure of the sealing rings, it may be here mentioned that the end 12 of the sleeve is preferably supplied with a packing gland nut 14 containing suitable packing 14' for acting as a wiper on the piston rod in order to prevent dust entering the stuffing box and causing damage therein.

Now, turning to the sealing rings, it will be observed that there are four of the contractile type shown in the drawings by way of illustration, and it is to be understood that the number may be varied as dictated by circumstances. The contractile rings are suitably spaced axially in the sleeve 2 and are generally indicated by the reference numeral 15. The two intermediate ones are individually contained in grooves 16, Fig. 4, and are free to contract about the rod 1 so as to compose sealing stations therewith. The two outer ones are each contained in a cage or case 16' in cooperation with an expansile ring 17. This cage or case is lodged in a recess as at 18 provided in the sleeve 2, and is held against turning therein as by means of a dowel 19—see Fig. 1. The cage or case is composed of a pair of separable members having a screw-threaded connection 19' supplied with an annular packing strip 20, as clearly shown in Fig. 9.

The contractile rings are of identical construction and each is made up of a number of segments 21, preferably four, in overlapping formation and of a step design as detailed in Fig. 6, providing offset portions 22, 22. The ends of the offset portions are biased as at 23 so that adjacent ends of the segments will accommodate intervening wedges 24 (detailed in Fig. 7) which are urged inwardly against the rod 1 in the contraction of the ring segments about the same. The inclined faces of the wedges are furnished with tongues 25 fitted in grooves 26 formed in the biased end faces 23 of the segments. The tongue and groove arrangement functions to retain the wedges in place and to provide a tight seal at the several junctures. Each wedge carries a light tension spring 27 at the top, having arms which are seated in niches 28 provided in the top faces of said segments. The springs operate to keep the wedges tightly up in the end portions of the complementary segments. Although the wedges may be situated fairly closely together in respect of the circumferential extent of the ring, there should be some intervening overlap of the segments as between adjacent wedges in order to assure of a good seal. The wedges, it will be understood, function solely to seal the ends of the segments 21 to preclude any possibility of a "blow by" on the ring. The wedges should be of a softer metal than the segments as pressure is applied only on the segments, which is effected by pins 29 having a pointed end seated in an indent 30 of each segment medially of its length. Said pins form a part of pressure shoes generally indicated at 31 which operate to prevent the rings from turning as well as to distribute the pressure uniformly thereon.

Four of the pressure shoes are used for each contractile ring, as will be seen from an inspection of Fig. 2. These extend radially in holes 32 formed in the housing 3 and sleeve 2, which holes are brought into alignment by the key 9 in the fitting of the sleeve into the housing. In addition to said pins 29, the shoes each comprise a follower 33 and a compression spring 34. The spring is interposed between the pin and the follower and encircles the reduced ends 35 thereof. The shoes resiliently urge the segments of the rings into sealing contact with the piston rod, and the spring tension is adjustable to suit operating conditions. The adjustment is accomplished by the rotatable sleeve 8, and for this purpose it is supplied with a series of internal eccentric faces 36 for each set of shoes. The eccentric faces are engaged with the followers 33 to force them inwardly when the sleeve 8 is turned in one direction and to slack them off when it is turned in the opposite direction. To permit of assembly, the sleeve is drilled at an end of each eccentric or cam face to provide a hole for insertion of the respective shoe parts after the sleeve is placed on the housing. The hole is then plugged by a screw as at 37. The pin and the follower of each shoe are so proportioned that their reduced parts 35 will be brought into abutting relation, as shown in Fig. 3, when the adjustment sleeve is turned through a predetermined angle, in consequence of which further movement on the part of the sleeve results in a positive tightening action by the shoes instead of the impositive pressure of the springs.

In order that an attendant may be able to ascertain the position to which adjusting sleeve 8 is turned and estimate the wear on the rings, graduations 38 are supplied on this sleeve for registering with an arrow 39 or other mark on the housing. The graduations represent the full turn in accord with the throw or length of the eccentric faces 36 and are marked at one end with the notation "zero" to denote the point at which the adjustment takes places. The other end is marked "limit" to denote the finish of the adjustment, and at a point in advance thereof the marking "positive contact" designates the place at which the reduced ends 35 of the followers and the pins make contact. By this arrangement, the attendant may take a reading at any time and know the amount of adjustment that has been utilized and what is available. It will be understood that in making an adjustment, the nut 7 must be loosened. Sleeve 8 may be turned by suitable means such as by a wrench, for which a circular series of holes 39 are furnished. Pressure on the rings 15 may be increased or decreased simply by turning the sleeve 8 in the proper direction and the graduations obviate the dismantling of the device in making an adjustment. It will be gathered, however, that the wear of the packing rings will be an essential factor in the relative positions of the pins, and therefore a given graduation would not indicate "positive contact" over the life of the device. Consequently some expedient should be resorted to for shifting the notation "positive contact" as wear takes place on the packing rings. This might be accomplished, for example, by inserting this notation upon an index plate and mounting it adjustably upon the sleeve. Other expedients will suggest themselves to those skilled in the art; and any known means may be resorted to. No claim is made to the feature of graduating the sleeve to indicate wear of the packing rings. It will be understood that the piston rod should not be in operation while an adjustment is being effected. Sleeve 8 may be made a ground fit on the housing and the ring container sleeve 2 should be a press fit in the housing to seal the halves together.

Adverting to the expansile rings 17, of which there are two, one in each of the cages or cases 16' at the outer side of contractile ring 15 therein, these expansile rings are each constructed to be urged expansively to form sealing contact with the internal surface 40 at the same time that side pressure is applied by resilient shoe devices 41 to urge each of them against the adjacent contractile ring.

Each expansile ring has a single split of stepped formation so as to provide overlapping parts 42, the ends of which are acted upon by wedges 43 having interposed rockers 44 of a semi-circular shape. The straight faces 45 of the rockers are engaged with the inclined faces 46 of the wedges and are grooved as at 47 to interfit with tongues 48 on the wedges. The curved faces of the rockers are grooved as at 49 to interfit with similar tongues on the adjacent end faces of the split of the ring, which curved faces are seated in arcuate recesses so as to retain the rockers in place and to produce a rocking motion to accommodate movement of the wedges outwardly in expanding the rings 17 to which they belong. The expanding action is brought about by the tension applied on each wedge by a circular wire spring 50 of the split type which is inserted under stress in a groove 51 in the ring inwardly of the wedge thereof. This groove is eccentric to the ring and this provides clearance for expansion of the wire spring to permit it to urge the wedge outwardly for spreading the ring. By this construction, the wedge and rockers make a complete seal for the split of the ring. The wire spring is clear of the piston rod and is free to press the spreader wedge outwardly.

The resilient shoes 41 comprise a circular series of pins 52 spaced around each expansile ring 17 and carried by a plate 53 bearing against a side wall of the cage or case 16'. The outer ends of these pins are apertured and each is fitted with a follower 54 having a reduced part freely slidable in the apertured portion. Encircling each pin and its follower is a compression spring 55 having one end seated on the plate and the other similarly disposed against the adjacent side of the expansile ring to force it axially against the companion contractile ring, which in turn bears against the adjoining side of the case. The clearance between the pins 52 and the followers 54 is merely sufficient to take care of heat expansion.

This construction supplies an oil and pressure unit which affords a complete seal against pressure, vacuum, oil and grease. It is a self-contained unit which when assembled is lodged in the recess 18. In the variant form of the ring 17 shown in Fig. 14, the only difference is that each part 43 has the spreader wedge structure applied to it, which is only a matter of duplication of parts.

For lubrication of the piston rod, an oil duct 56 is made in the housing and in the sleeve 2 so as to form a connection with a force-feed oil line for a groove or channel 57 in this sleeve and encircling the piston rod between the intermediate rings 15.

Having described a practical embodiment of the stuffing box, it will be obvious to those skilled in the art that various changes and modifications may be resorted to as coming within the spirit and scope of the invention as herein recounted and defined in the appended claims.

What I claim is:

1. In a device of the class described, a sealing ring of the split type having biased junction faces, a wedge block disposed between said faces and sealing the juncture, and retaining means for said wedge block, said means being carried solely by said wedge and engaged with the split portion of said sealing ring to urge the wedge upwardly against said biased junction faces.

2. In a device of the class described, a sealing ring of split formation having biased junction faces, a wedge block disposed between said faces, and retaining means for the wedge block, said means comprising a pair of resilient arms divergently extending from the top portion of the wedge block and engaging adjoining split parts of the sealing ring.

3. In a device of the class described, a sealing ring comprised of stepped segments disposed in overlapping formation having biased junction faces, said faces being grooved, a wedge engaged with adjacent faces of the segments, tongues carried by the wedge and fitted in the grooves of said faces, and a spring device attached to said wedge having resilient arms spread over adjoining portions of said segments and seated in niches provided therein, so as to keep the wedge tightly in place.

4. In a device of the class described, a sealing ring of split formation having curved rocker seats formed in its junction faces, rockers lodged in said seats, a wedge disposed between adjacent rockers for spreading the ring, and a spring applying spreading force on the wedge.

5. A structure in accordance with claim 4 and in which the wedge is interfitted with the rockers by a tongue and groove connection and in which the rockers have a similar interfitting connection with the ring.

6. A structure in accordance with claim 4 and in which the ring is stepped at the split portion to provide overlapping parts, and in which the spring is a circular wire member seated on a groove in the ring.

7. In a device of the class described, a housing, a contractile ring therein, means for applying contractile pressure upon the ring, said means comprising a circular series of pins lodged in radial apertures within the housing and engaged with the ring, followers disposed in said apertures outwardly of said pins and projecting from said housing, helical compression springs shouldered between the pins and the followers, and a sleeve rotatably encircling the housing and having an internal series of eccentric faces engaged with the followers to urge them inwardly when the sleeve is turned in one direction.

8. In a device of the class described, a sealing ring of split formation divided into segments having rocker seats formed in adjacent junction faces and curved on an arc of a circle, rockers lodged in the seats of said adjacent junction faces, each rocker having a curved face conforming to said seats and having a flat face, and a wedge disposed between adjacent rockers and engaged with the flat face thereof.

9. A device as set forth in claim 8, in which the wedge has means by which it is interfitted with the rockers, and in which the rockers have means by which they are interfitted with the adjacent junction faces of the ring segments.

10. A device as set forth in claim 7, in which the pins and followers have parts directed toward each other and normally spaced apart to permit of a predetermined compressive movement of the springs, whereby the pins positively act on the followers when the said parts are brought into abutting engagement.

JOHN D. SUMMERS.